(12) United States Patent
McWilliams et al.

(10) Patent No.: US 7,036,114 B2
(45) Date of Patent: Apr. 25, 2006

(54) METHOD AND APPARATUS FOR CYCLE-BASED COMPUTATION

(75) Inventors: Thomas M. McWilliams, Menlo Park, CA (US); Jeffrey B. Rubin, Pleasanton, CA (US); Derek E. Pappas, Union City, CA (US); Oyekunle A. Olukotun, Stanford, CA (US); Jeffrey M. Broughton, Palo Alto, CA (US); David R. Emberson, Santa Cruz, CA (US); William kwei-cheung Lam, Newark, CA (US); Liang T. Chen, Saratoga, CA (US); Ihao Chen, San Jose, CA (US); Earl T. Cohen, Fremont, CA (US); Michael W. Parkin, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 701 days.

(21) Appl. No.: 10/113,005

(22) Filed: Mar. 29, 2002

(65) Prior Publication Data

US 2003/0040896 A1 Feb. 27, 2003

Related U.S. Application Data

(60) Provisional application No. 60/313,735, filed on Aug. 20, 2001, provisional application No. 60/313,217, filed on Aug. 17, 2001.

(51) Int. Cl.
*G06F 9/45* (2006.01)

(52) U.S. Cl. .............. 717/149; 717/136; 719/152

(58) Field of Classification Search ........ 717/135–140, 717/149–155, 156, 158
See application file for complete search history.

(56) References Cited

U.S. PATENT DOCUMENTS

| | | | |
|---|---|---|---|
| 4,885,684 A | | 12/1989 | Austin et al. |
| 5,121,498 A | * | 6/1992 | Gilbert et al. ............... 717/149 |
| 5,274,818 A | | 12/1993 | Vasilevsky et al. |
| 5,561,802 A | * | 10/1996 | Orimo et al. ................ 717/136 |
| 5,872,990 A | * | 2/1999 | Luick et al. .................. 712/24 |
| 5,913,925 A | * | 6/1999 | Kahle et al. ................ 712/206 |
| 6,021,274 A | * | 2/2000 | Reed et al. .................. 717/149 |

(Continued)

FOREIGN PATENT DOCUMENTS

EP 1 107 116 A2 6/2001

OTHER PUBLICATIONS

Gross et al, "Compilation for a high performance systolic array", ACM pp 27-38, 1986.*

(Continued)

*Primary Examiner*—Anil Khatri
(74) *Attorney, Agent, or Firm*—Osha Liang LLP

(57) ABSTRACT

A computer system for cycle-based computation includes a processor array, a translation component adapted to translate a cycle-based design, a host computer operatively connected to the processor array and to the translation component, a data connection component interconnecting a plurality of members of the processor array using static routing, a synchronization component enabling known timing relationships among the plurality of members of the processor array, a host service request component adapted to send a host service request from a member of the processor array to the host computer, and an access component adapted to access a portion of a state of the processor array and a portion of a state of the data connection.

59 Claims, 14 Drawing Sheets

U.S. PATENT DOCUMENTS

| | | | |
|---|---|---|---|
| 6,058,266 A * | 5/2000 | Megiddo et al. | 717/156 |
| 6,059,841 A * | 5/2000 | Caracuzzo | 717/154 |
| 6,070,011 A * | 5/2000 | Liu et al. | 717/160 |
| 6,438,747 B1 * | 8/2002 | Schreiber et al. | 717/160 |
| 6,507,947 B1 * | 1/2003 | Schreiber et al. | 717/160 |
| 6,772,299 B1 * | 8/2004 | McWilliams et al. | 711/145 |
| 6,792,599 B1 * | 9/2004 | Poulsen et al. | 717/136 |
| 6,925,634 B1 * | 8/2005 | Hunter et al. | 717/124 |

OTHER PUBLICATIONS

Cabodi et al, "Computing times transition relations for sequential based simulation", ACM poc. of the conf. on design, automation tested in Europe, article No. 4, pp 1-5, 1999.*

Kanellakis et al, "Efficient parallel algorithms on restartable fail stop procesors", ACM pp 23-36, 1991.*

Mendelson et al, "Mapping data flow programs on aVLSI array of processors", ACM pp 72-80, 1987.*

Hwang, Jing-Jang, Chow, Yuan-Chieh, Anger, Frank D., Lee, Chung-Yee; "*Scheduling Precedence Graphs in Systems with Interprocessor Communication Times*;" Journal; Apr. 1989; pp. 244-257; vol. 18, No. 2; Siam Journal Computing.

Wu, Min-You and Gajski, Daniel D.; "*Hypertool: A Programming Aid For Message-Passing Systems;*" Jul. 1990; pp. 1-26; vol. 1, No. 3; IEEE Transactions On Parallel and Distributed Systems.

Dally, William J., Fiske, J.A. Stuart, Keen, John S., Lethin, Richard A., Noakes, Michael D., Nuth, Peter R., Davison, Roy E., Fyler, Gregory A.; "*The Message-Driven Processor, A Multicomputer Processing Node with Efficient Mechanisms;*" Apr. 1992; pp. 23-39; IEEE Micro.

Sih, Gilbert C., Lee, Edward A. Lee; "*A Compile-Time Scheduling Heuristic for Interconnection-Constrained Heterogeneous Processor Architectures;*" Feb. 1993; pp. 175-187; vol. 4, No. 2; IEEE Transactions On Parallel and Distributed Systems.

Yang, Tao and Gerasoulis, Apostolos; "*DSC: Scheduling Parallel Tasks on an Unbounded Number of Processors;*" Sep. 1994; pp. 1-36; vol. 5, No. 9; IEEE Transactions On Parallel and Distributed Systems.

Alpert, Charles J. and Kahng, Andrew B.; "*Recent Directions in Netlist Partitioning: A Survey;*" 1995; pp. 1-93; UCLS Computer Science Department.

Kwok, Yu-Kwong, Ahmad, Ishfaq; "*Dynamic Critical-Path Scheduling: An Effective Technique for Allocating Task Graphs to Multiprocessors;*" May 1996; pp. 506-521; vol. 7, No. 5; IEEE Transactions On Parallel and Distributed Systems.

Quickturn Cobalt Webpage; "*Quickturn Boosts Speed, Flexibility in CoBALT 2.0;*" Apr. 20, 1998; pp. 1-4.

Vivek Sarkar; "*Partitioning and Scheduling Parallel Programs for Multiprocessors;*" Copyright 1989, pp. 1-201, The MIT Press.

C. Ajluni; "Advanced Emulation Tool Targets High-Speed Functional Verification"; vol. 45, No. 5, pp. 80, 82; Mar. 3, 1997; Electronic Design, Penton Publishing, USA.

European Search Report dated Apr. 21, 2004 (5 pgs.).

* cited by examiner

METHOD AND APPARATUS FOR CYCLE-BASED COMPUTATION

CROSS-REFERENCE TO RELATED APPLICATIONS

This application claims benefit of U.S. Provisional Application Ser. No. 60/313,735, filed Aug. 20, 2001, entitled "System Related Inventions," in the names of Thomas M. McWilliams, Jeffrey B. Rubin, Michael W. Parkin, Oyekunle A. Olukotun, Derek E. Pappas, Jeffrey M. Broughton, David R. Emberson, Ashley N. Saulsbury, Earl T. Cohen, William kwei-cheung Lam, Liang T. Chen, Ihao (NMI) Chen, Jay Reynolds Freeman, Ankur (NMI) Narang, David Chenevert, Nyles I. Nettleton, Tom Riddle, James B. Burr, and David S. Allison.

This application claims benefit to Provisional Application Ser. No. 60/313,735, filed Aug. 17, 2001, entitled "Phaser System Architecture," and invented by Thomas M. McWilliams; Jeffrey B. Rubin; Derek Pappas; Kunle Olukoton; Jeffrey Broughton; David R. Emberson; William Lam; Liang T. Chen; Ihao Chen; Earl T. Cohen; and Michael Parkin.

BACKGROUND OF INVENTION

The invention relates to simulation of microprocessor performance. Modern high performance microprocessors have an ever-increasing number of circuit elements and an ever-rising clock frequency. Also, as the number of circuits that can be used in a CPU has increased, the number of parallel operations has risen. Examples of efforts to create more parallel operations include increased pipeline depth and an increase in the number of functional units in superscalar and very-long-instruction-word architectures. As CPU performance continues to increase, the result has been a larger number of circuits switching at faster rates. Thus, from a design perspective, important considerations such as the time needed to complete a simulation and the time needed to debug a CPU must be taken into account.

As each new CPU design uses more circuit elements, each often operating at increased frequencies, the time required to simulate the design increases. Due to the increased time for simulation, the number of tests, and consequently the test coverage, decreases. In general, the result has been a dramatic increase in the logic errors that escape detection before the CPU is manufactured.

After a CPU prototype is initially manufactured and failure modes are uncovered, the time required to determine failure mechanisms is generally increasing due to the increased CPU complexity. Failure modes may be the result of logic errors or poor manufacturability of a circuit element. In both cases, circuit simulation helps to confirm or refute the existence of a logic error. If a logic error does not exist, the manufacturability of a circuit element may be the root cause. Even after a logic error failure mechanism is discovered and a solution is proposed, the time required to satisfactorily determine that the proposed solution fixes the logic error and does not generate any new logic errors has increased. Circuit simulation is key to the design and debugging of increasingly complex and faster CPUs.

CPU simulation may occur at a "switch-level." Switch-level simulations typically include active circuit elements (e.g., transistors) and passive circuit elements (e.g., resistors, capacitors, and inductors). A typical switch-level circuit simulator is "SPICE", which is an acronym for Simulation Program with Integrated Circuit Emphasis. SPICE typically models each element using an equation or lookup table. SPICE can model accurately the voltage and/or current of each circuit element across time.

CPU simulation also may occur at a "behavioral level." Behavioral level simulations typically use a hardware description language (HDL) that determines the functionality of a single circuit element or group of circuit elements. A typical behavioral level simulation language is "Verilog," which is an Institute of Electrical and Electronics Engineers standard. Verilog HDL uses a high-level programming language to describe the relationship between the input and output of one or more circuit elements. The Verilog HDL describes on what conditions the outputs should be modified and what effect the inputs have. Verilog HDL programs may also be used for logic simulation at the "register transfer level" (RTL).

Using the Verilog HDL, for example, digital systems are described as a set of modules. Each module has a port interface, which defines the inputs and outputs for the module. The interface describes how the given module connects to other modules. Modules can represent elements of hardware ranging from simple gates to complete systems. Each module can be described as an interconnection of sub-modules, as a list of terminal elements, or a mixture of both. Terminal elements within a module can be described behaviorally, using traditional procedural programming language constructs such as "if" statements and assignments, and/or structurally as Verilog primitives. Verilog primitives include, for example, truth tables, Boolean gates, logic equation, and pass transistors (switches).

HDL languages such as Verilog are designed for efficient representation of hardware designs. Verilog has support for handling signals of arbitrary widths, not only for defining and using an arbitrary width signal, but for treating any sub-field of such a signal as a signal in its own right.

Cycle-based logic simulation is applicable to synchronous digital systems and may be used to verify the functional correctness of a digital design. Cycle-based simulators use algorithms that eliminate unnecessary calculations to achieve improved performance in verifying system functionality. Typically, in a cycle-based logic simulator the entire system is evaluated once at the end of each clock cycle. Discrete component evaluations and re-evaluations are typically unnecessary upon the occurrence of every event.

HDL simulations may be event-driven or cycle-based. Event-driven simulations propagate a change in state from one set of circuit elements to another. Event-driven simulators may record relative timing information of the change in state so that timing and functional correctness may be verified. Cycle-based HDL simulations also simulate a change in state from one set of circuit elements to another. Cycle-based HDL simulations, however, evaluate the state of the system once at the end of each clock cycle. While specific intra-cycle timing information is not available, simulation speed is improved.

HDL simulations may be executed on reconfigurable hardware, such as a field programmable gate array (FPGA) chip. The FPGA allows dedicated hardware to be configured to match the HDL code. FPGA hardware provides a method to improve the simulation time. As the design changes, the time required to reconfigure the FPGA arrangement may prohibit many iterations. Also, the number of FPGA chips required for complex designs may be relatively large.

HDL simulations also may be executed on general purpose processors. General purpose processors, including parallel general purpose processors, are not designed specifically for HDL simulations. HDL simulations require a large number of operations of inputs and outputs that use bit-wise operations.

Large logic simulations are frequently executed on parallel or massively parallel computing systems. For example, parallel computing systems may be specifically designed parallel processing systems or a collection, or "farm," of connected general purpose processing systems. FIG. 1 shows a block diagram of a typical parallel computing system (100) used to simulate an HDL logic design. Multiple processor arrays (112, 113, 129) are available to simulate the HDL logic design. A host computer (116), with associated data store (117), controls a simulation of the logic design that executes on one or more of the processor arrays (112, 113, 129) through an interconnect switch (118). The processor arrays (112, 113, 129) may be a collection of processing elements or multiple general purpose processors. The interconnect switch (118) may be a specifically designed interconnect or a general purpose communication system, for example, an Ethernet network.

A general purpose computer (120) with a human interface (122), such as a GUI or a command line interface, together with the host computer (116) support common functions of a simulation environment. These functions typically include an interactive display, modification of the simulation state, setting of execution breakpoints based on simulation times and states, use of test vectors files and trace files, use of HDL modules that execute on the host computer and are called from the processor arrays, check pointing and restoration of running simulations, the generation of value change dump files compatible with waveform analysis tools, and single execution of a clock cycle.

SUMMARY OF INVENTION

In general, in one aspect, the invention comprises a computer system for cycle-based computation. The computer system comprises a processor array, a translation component adapted to translate a cycle-based design, a host computer operatively connected to the processor array and to the translation component, a data connection component interconnecting a plurality of members of the processor array using static routing, a synchronization component enabling known timing relationships among the plurality of members of the processor array, a host service request component adapted to send a host service request from a member of the processor array to the host computer, and an access component adapted to access a portion of a state of the processor array and a portion of a state of the data connection.

In general, in one aspect, the invention comprises a computer system for cycle-based computation. The computer system comprises a processor array, a translation component adapted to translate a cycle-based design, a host computer operatively connected to the processor array and to the translation component, a data connection component interconnecting a plurality of members of the processor array using static routing, a synchronization component enabling known timing relationships among the plurality of members of the processor array, a host service request component adapted to send a host service request from a member of the processor array to the host computer, an access component adapted to access a port of a state of the processor array and a portion of a state of the data connection, a loading mechanism to load the execution processor code onto the processor array from the host computer, a callback mechanism enabling a portion of the cycle-based computation to be performed on the host computer, and a plurality of simulation domains.

In general, in one aspect, the invention comprises a method for performing computation on a cycle-based computing environment. The method comprises translating a cycle-based design into cycle-based computation code, executing the cycle-based computation code on a member of a processor array to generate a message, statically routing the message along a data connection component, synchronizing execution of the cycle-based computation code, sending a host service request from the member of the processor array to a host computer, and accessing a portion of a state of the processor array and apportion of a state of data connection component.

In general, in one aspect, the inventor comprises a method for performing computation on a cycle-based computing environment. The method comprises translating a cycle-based design into cycle-based computation code, executing the cycle-based computation code on a member of a processor array to generate a message, statically routing the message along a data connection component, synchronizing execution of the cycle-based computation code, sending a host service request from the member of the processor array to a host computer, accessing a portion of a state of the processor array an a portion of a state of a data connection component, executing a portion of the cycle-based design on the host computer, responding to the host service request.

In general, in one aspect, the invention comprises a method of preparing a cycle-based design for simulation. The method comprises verifying a design standard of the cycle-based design using a style checker to generate a verified cycle-based design, compiling the verified cycle-based design to produce execution processor code and a routing table, and producing a simulation by executing the execution processor code on a member of a processor array, wherein the simulation uses the routing table to statically route a message to the member of the processor array.

In general, in one aspect, the invention comprises a method of synchronizing cycle-based computation on a processor array. The method comprises executing execution processor code on the processor array, detecting a value of a run bit associated with a member of the processor array, halting execution of execution processor code on the processor array if a host server request from the member of the processor array is detected, and resuming execution of execution processor code on the processor array if the value of the run bit has a predetermined value, and the host service request from the member of the processor array is not detected.

In general, in one aspect, the invention comprises a method of synchronizing cycle-based computation on a processor array. The method comprises executing execution processor code on the processor array, detecting a value of a run bit associated with a member of the processor array, halting execution of execution processor code on the processor array if a host service request from the member of the processor array is detected, resuming execution of execution processor code on the processor array if the value of the run bi thas a predetermined value, and the host service request from the member of the processor array is not detected, polling the member of the processor array to detect the host service request from the member of the processor array, polling the member of the processor array to detect a reply tree message from the member of the processor array, and resuming execution of execution processor code on the processor array if the value of the run bit has a predetermined value, and a reply tree message from the member of the processor array is not detected.

In general, in one aspect, the invention comprises an apparatus for performing computation on a cycle-based computing environment. The apparatus comprises a means for translating a cycle-based design into cycle-based computation code, means for executing the cycle-based computation code on a member of a processor array to generate a message, means for statically routing the message along a data connection component, means for synchronizing execution of the cycle-based computation code, means for sending a host service request from the member of the processor array to a host computer, and means for accessing a portion of a state of the processor array and a portion of a state of a data connection component.

In general, in on aspect, the invention comprises an apparatus for preparing a cycle-based design for simulation. The apparatus comprises means for verifying a design standard of the cycle-based design using a style checker to generate a verified cycle-based design, means for compiling the verified cycle-based design to produce execution processor code and a routing table, and means for producing a simulation by executing the execution processor code on a member of a processor array, wherein the simulation uses the routing table to statically route a message to the member of the processor array.

In general, in one aspect, the invention comprises an apparatus for synchronizing cycle-based computation on a processor array. The apparatus comprises means for executing execution processor code on the processor array, means for detecting a value of a run bit associated with a member of the processor array, means for halting execution of execution processor code on the processor array if a host service request from the member of the processor array is detected, and means for resuming execution of execution processor code on the processor array if the value of the run bit has a predetermined value, and the host service request from the member of the processor array is not detected.

Other aspects and advantages of the invention will be apparent from the following description and the appended claims.

DETAILED DESCRIPTION

Figure 1:
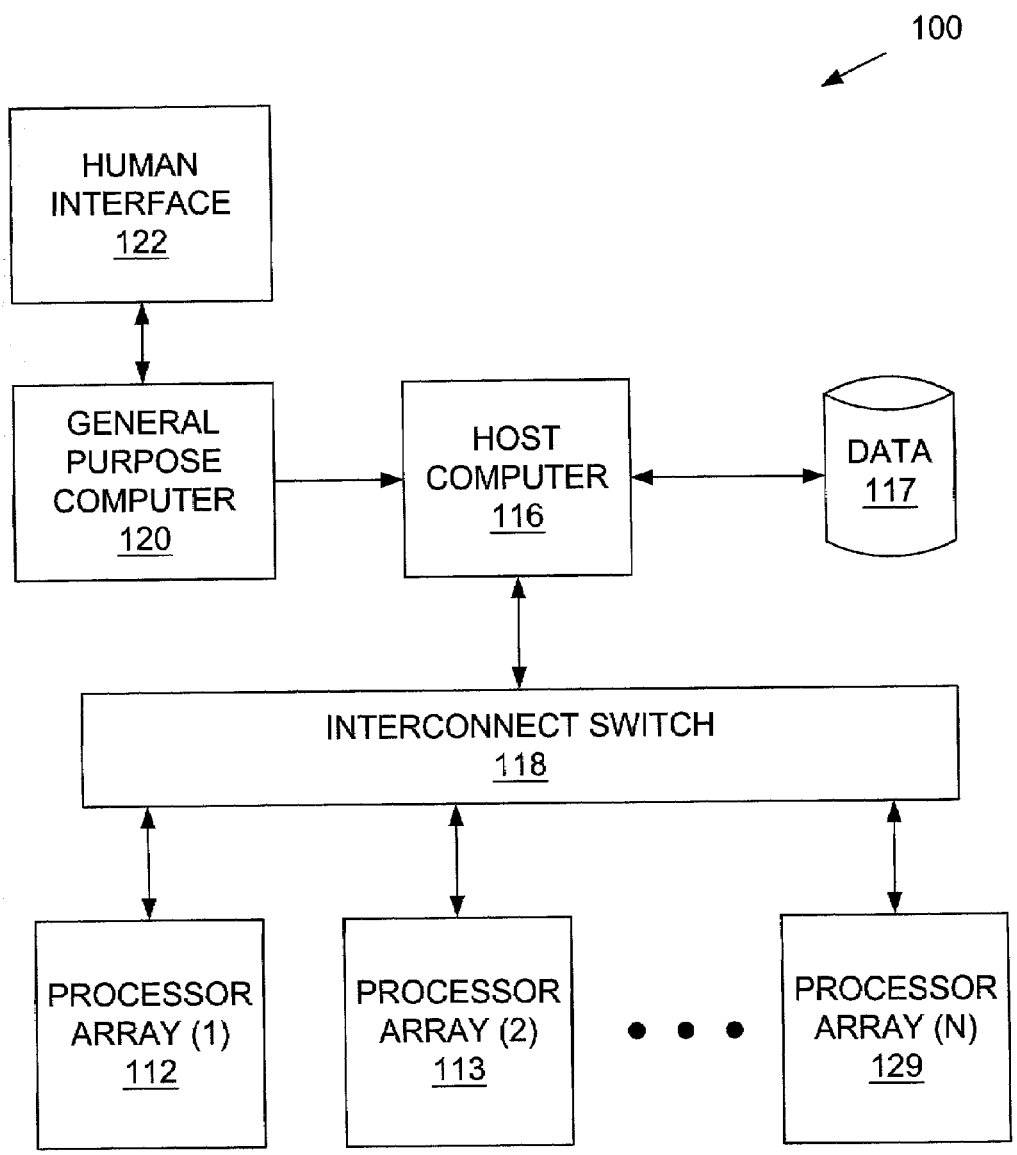
FIG. 1 shows a typical parallel computer system.

The present invention is a method and apparatus for cycle-based computation in a simulation system. In the following detailed description of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Specific embodiments of the invention will now be described in detail with reference to the accompanying figures. Like elements in the various figures are denoted by like reference numerals for consistency.

Before describing in further detail cycle-based computation in a simulation system, a computer execution environment and a class of simulation systems (e.g., multiple instruction, multiple data (MIMD)) used with one or more embodiments of the invention is described below.

In an embodiment of the present invention, the computer execution environment may use execution processors to execute execution processor code on a general purpose computer, such as a SPARC™ workstation produced by Sun Microsystems, Inc., or specialized hardware for performing cycle-based computations, e.g. a Phaser system.

The specialized hardware for performing cycle-based computations is a massively parallel, cycle-based computing system. The system uses an array of execution processors arranged to perform cycle-based computations. One example of cycle-based computation is simulation of a cycle-based design written in a computer readable language, such as HDL (e.g., Verilog, etc.), or a high-level language (e.g., Occam, Modula, C, etc.).

Figure 2:
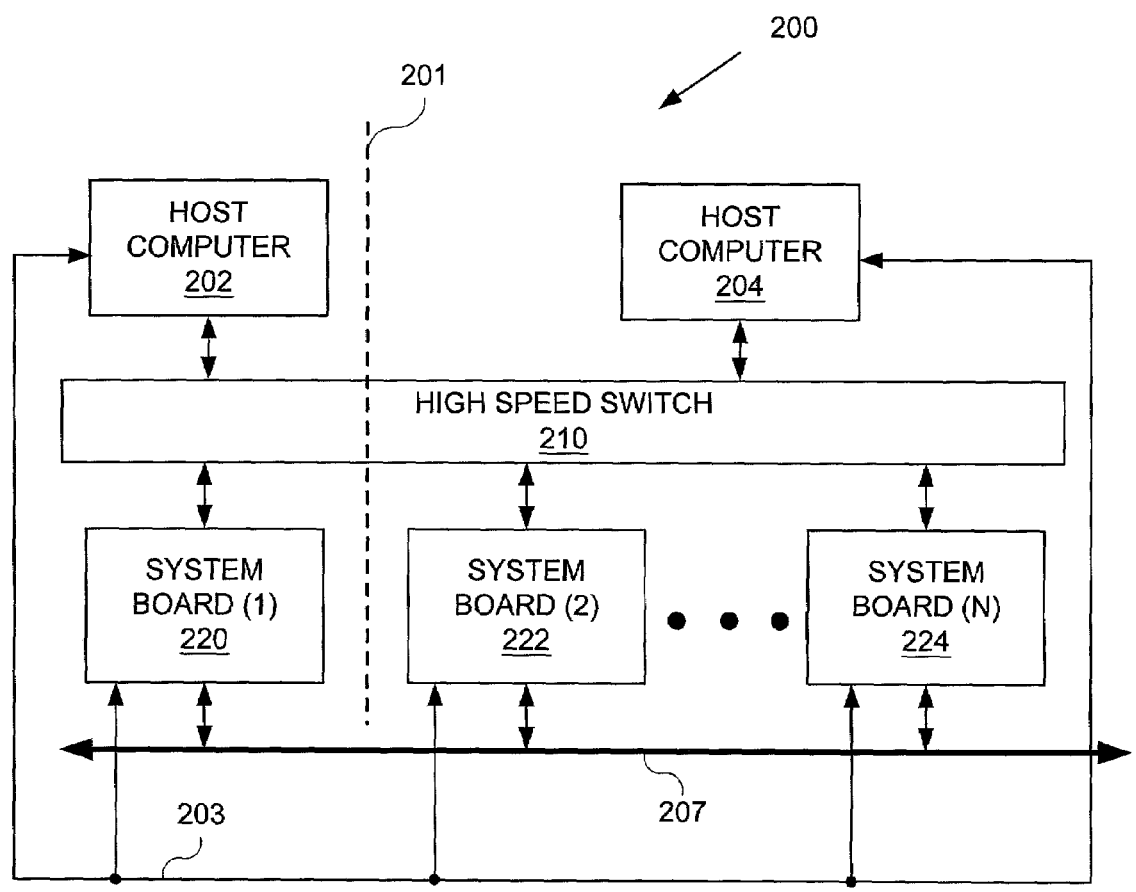
FIG. 2 shows a parallel computer system in accordance with an embodiment of the present invention.

FIG. 2 shows exemplary elements of a system (200), in accordance with one or more embodiments of the present invention. Cycle-based computation, such as a logic simulation on the system (200), involves one or more host computers (202, 204) managing the logic simulation(s) executing on one or more system boards (220, 222, 224). Each system board contains one or more Application Specific Integrated Circuits (ASIC). Each ASIC contains multiple execution processors. The host computers (202, 204) may communicate with the system boards (220, 222, 224) using one of several pathways. The host computers (202, 204) include interface hardware and software as needed to manage a logic simulation. A high speed switch (210) connects the host computers (202, 204) to the system boards (220, 222, 224). The high speed switch (210) is used for loading and retrieval of state information from the execution processors located on ASICs on each of the system boards (220, 222, 224). The connection between the host computers (202, 204) and system boards (220, 222, 224) also includes an Ethernet connection (203). The Ethernet connection (203) is used for service functions, such as loading a program and debugging. The system also includes a backplane (207). The backplane (207) allows the ASICs on one system board to communicate with the ASICs of another system board (220, 222, 224) without having to communicate with an embedded controller located on each system board. Additional system boards may be added to the system by connecting more system boards to the backplane (207).

The system boards may be divided into simulation domains. Simulation domains are independent and are divided by a simulation domain boundary (201). For example, system board one (220) may be used to simulate a first cycle-based simulation that is loaded, accessed, and monitored by host computer (202) resulting in one simulation domain. System board (222) through system board (224) may be used to simulate a second cycle-based simulation that is loaded, accessed, and monitored by host computer (204) resulting in another simulation domain. The boundary dividing these two simulation domains is referred to as the simulation domain boundary (201). The simulation domain boundary (201) may include any number of system boards, as needed. In accordance with one embodiment of the present invention, there may exist only one system board within the boundary. In other embodiments of the invention, there may exist multiple system boards within the boundary.

Figure 3:
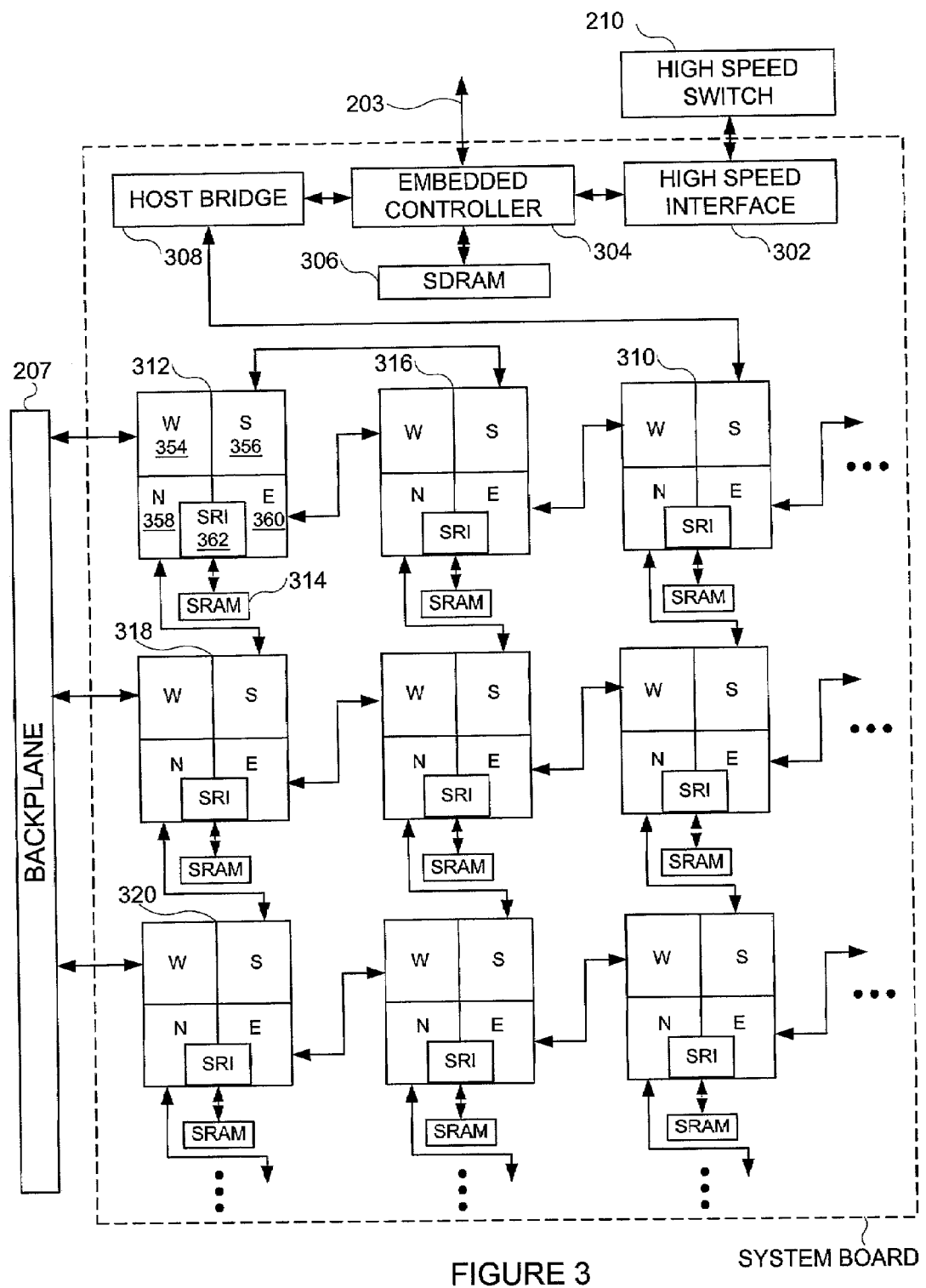
FIG. 3 shows a system board block diagram in accordance with an embodiment of the present invention.

FIG. 3 shows a block diagram of a system board in accordance with one or more embodiments of the present invention. The system board is representative of any of the system boards (e.g., system board (220, 222, 224)) shown in FIG. 2. The system board may include multiple ASICs. Each ASIC is connected via a two-dimensional mesh. Each ASIC has four input/output buffers referenced as North (N), South (S), East (E), and West (W). For example, an ASIC (312) has four input/output buffers N (358), S (356), E (360), and W (354). Each ASIC connects to other ASICs using the four input/output buffers, one for each neighboring ASIC. An edge ASIC may connect to other edge ASIC to create a secondary connection. For example, ASIC (312) and ASIC (316) connect using the E and W input/output buffers, respectively, and using their respective S input/output buffers. Another possible connection for edge ASICs is a connection to the backplane (207), which connects to other system boards. For example, ASICs (312, 318, 320) connect to the backplane, each using their respective W input/output buffers. Each ASIC may also connect to external memory in the form of static random access memory (SRAM) through a SRAM interface (SRI). For example, ASIC (312) connects to SRAM (314) through SRI (362).

One ASIC on each system board is used as an operative connection to an embedded controller. For example, ASIC (310) uses its S input/output buffer to connect to an embedded controller (304) through a host bridge (308). The embedded controller (304) connects to an Ethernet network (203), associated memory in the form of a synchronous dynamic random access memory (SDRAM) (306), and a high speed switch interface (302). The high speed switch interface (302) connects to the high speed switch (210). The SDRAM (304) may store instructions for the embedded controller (304).

Figure 4:
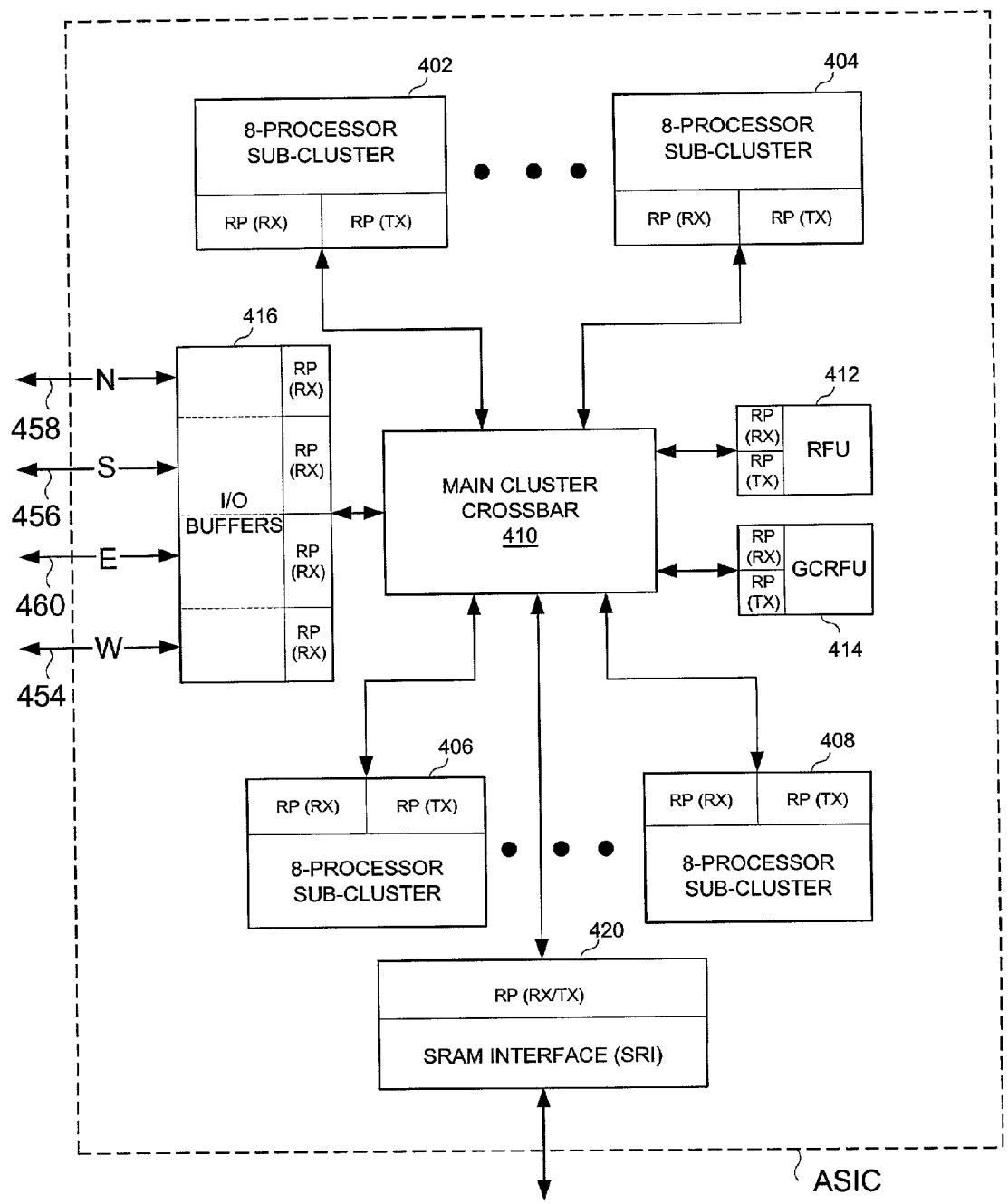
FIG. 4 shows an application specific integrated circuit block diagram in accordance with an embodiment of the present invention.

In accordance with one or more embodiments of the present invention, a block diagram of an ASIC is shown in FIG. 4. The ASIC is representative of any of the ASICs (e.g., ASIC (310, 312, 316, 318, 320)) shown in FIG. 3. A main cluster crossbar (410) connects to multiple terminal points. Each terminal point has at least one statically scheduled routing processor connected to at least one functional element. The main cluster crossbar (410) enables message passing and communication of information on the ASIC. For example, the main cluster crossbar (410) connects to a statically scheduled routing processor (not shown) that is associated with one of the input/output buffers (416), such as input/output buffer N (458). Other terminal points include, but are not limited to, additional input/output buffers (456, 460, 454), 8-processor sub-clusters (402, 404, 406, 408) that includes 8 processors connected by a sub-cluster crossbar, a SRI (420), a register file unit (RFU) (412), and a global control register file unit (GCRFU) (414).

In one or more embodiments of the present invention, each input/output buffer is associated with a statically scheduled routing processor that is arranged to receive information from another input/output buffer on a different ASIC. Alternate connections may include one of the input/output buffers communicating with the embedded controller (304) through the host bridge (308) or one of the input/output buffers connected to the backplane (207), as described previously. The RFU (412) is associated with two statically scheduled routing processors to send and receive information for temporarily parking messages routed on the main cluster crossbar. The GCRFU (414) is also associated with two statically scheduled routing processors to simultaneously send and receive information for temporarily parking messages routed on the main cluster crossbar and global control information, such as a broadcast tree arbiter to store messages and control functions. The SRI (420) is associated with a single statically scheduled routing processor that both sends and receives information; however the send or receive operation is not arrange to occur simultaneously. The SRI (420) provides an interface to external memory and may be accessed by the execution processors in the sub-clusters (402, 404, 406, 408) through the main cluster crossbar (410). Each 8-processor sub-cluster (402, 404, 406, 408) is associated with two statically scheduled routing processors, one to receive and one to send information simultaneously. Each statically scheduled routing processor is associated with a routing table to determine when and where the routing processor should send or receive information. Because the routing is determined a priori, a destination or origination address is not required in the transferred information. However, a tag identification is transferred with the information. The tag identification provides an arrangement to check that the received information occurred during the proper cycle. Each statically scheduled routing processor checks the tag identification to maintain proper operation of the system. Also, to ensure that no bit errors occurred during transmission, each statically scheduled routing processor may have an error correction mechanism to fix a limited number of bit errors.

Figure 5:
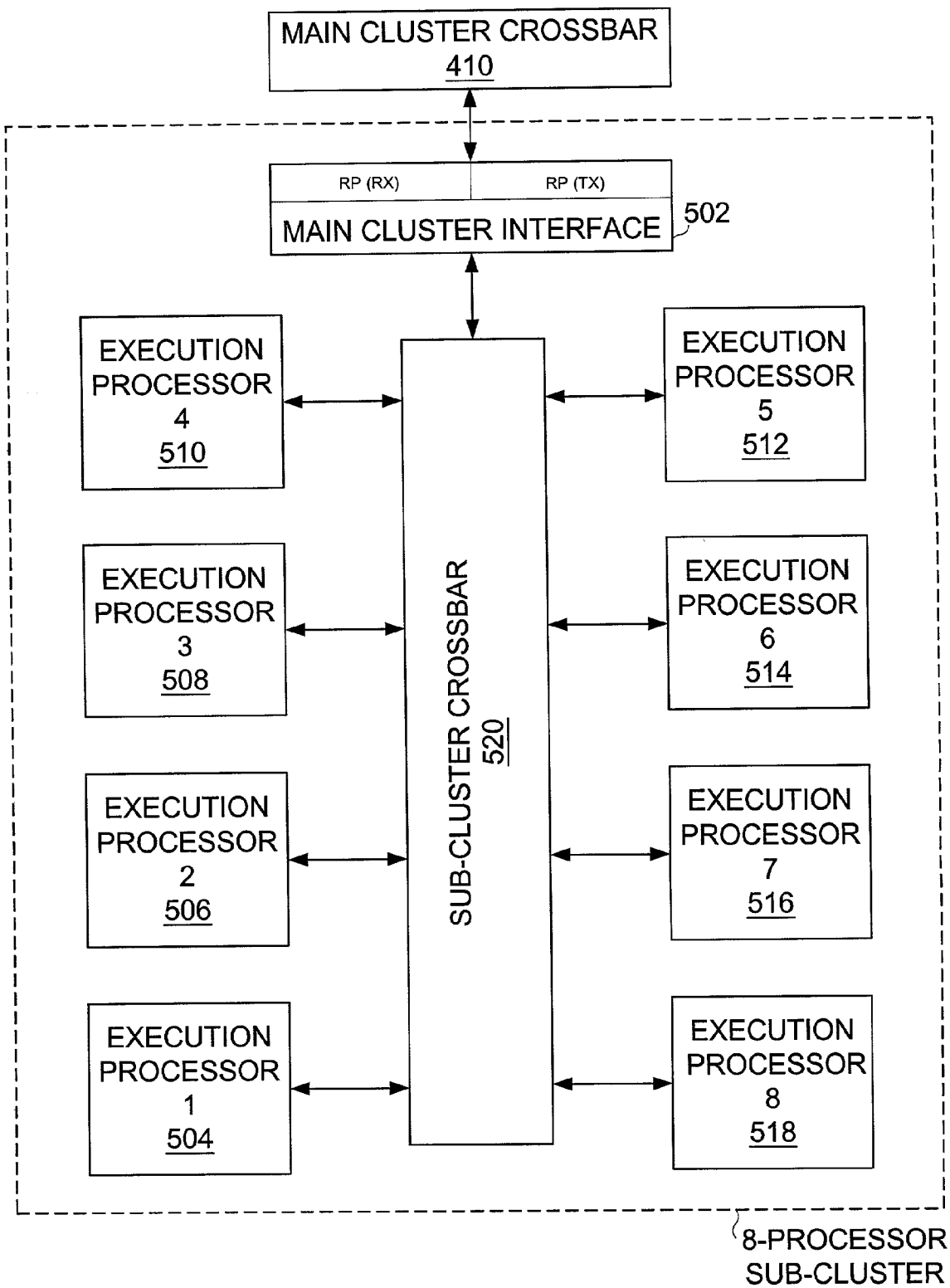
FIG. 5 shows a sub-cluster processor block diagram in accordance with an embodiment of the present invention.

In accordance with one or more embodiments of the present invention, an 8-processor sub-cluster is shown in FIG. 5. The 8-processor sub-cluster is representative of any of the 8-processor sub-cluster (e.g., 8-processor sub-cluster (402, 404, 406, 408)) shown in FIG. 4. The 8-processor sub-cluster has a sub-cluster crossbar (520) that connects to eight execution processors (504, 506, 508, 510, 512, 514, 516, 518) that perform cycle-based computation. The execution processors are capable of executing custom instructions that enable cycle-based computations, such as specific logic operations (e.g., four input, one output Boolean functions), and control instructions, such as a "synchronization" instruction that stalls an execution processor until all execution processors are ready to resume. The sub-cluster crossbar (520) is associated with a main cluster interface (502) that contains two statically scheduled routing processors to send and receive information simultaneously. The main cluster interface (502) transfers information over the main cluster crossbar (410).

The execution processors (504, 506, 508, 510, 512, 514, 516, 518) are capable of executing simulation instructions. Those skilled in the art will appreciate that the execution processors (504, 506, 508, 510, 512, 514, 516, 518) may natively execute an instruction image translated from the simulation instructions. The simulation instructions include, but are not limited to, RTL designs in Verilog or some other HDL. The execution of instructions on the execution processors (504, 506, 508, 510, 512, 514, 516, 518) is temporally synchronized by a global clock. To maintain coherent transmission of information across multiple execution processors, the execution processors transmit and receive the tag identification along with information.

Simulation of the cycle-based logic design in the system occurs on a processor array in two modes: a run mode segment and a control mode segment. Run mode segment is the basic simulation running mode. In the run mode segment, there is no communication necessary between the host and simulation system besides basic runtime control and the execution of any user-provided C coded routines. In the control mode segment, the host sends commands to the simulation hardware and waits for responses. This mode is typically used in debugging and initialization of the simulation system.

A processor array may exist as specialized hardware, such as a massively parallel computer system designed for simulation using cycle-based computation, or as part of an appropriate computer system, such as a SPARC™ workstation produced by Sun Microsystems, Inc. Cycle-based logic design may also be simulated on a processor array, or a portion of the processor array. Thus, references herein to the processor array may refer to a portion of the processor array, or to multiple processor arrays.

Figure 6:
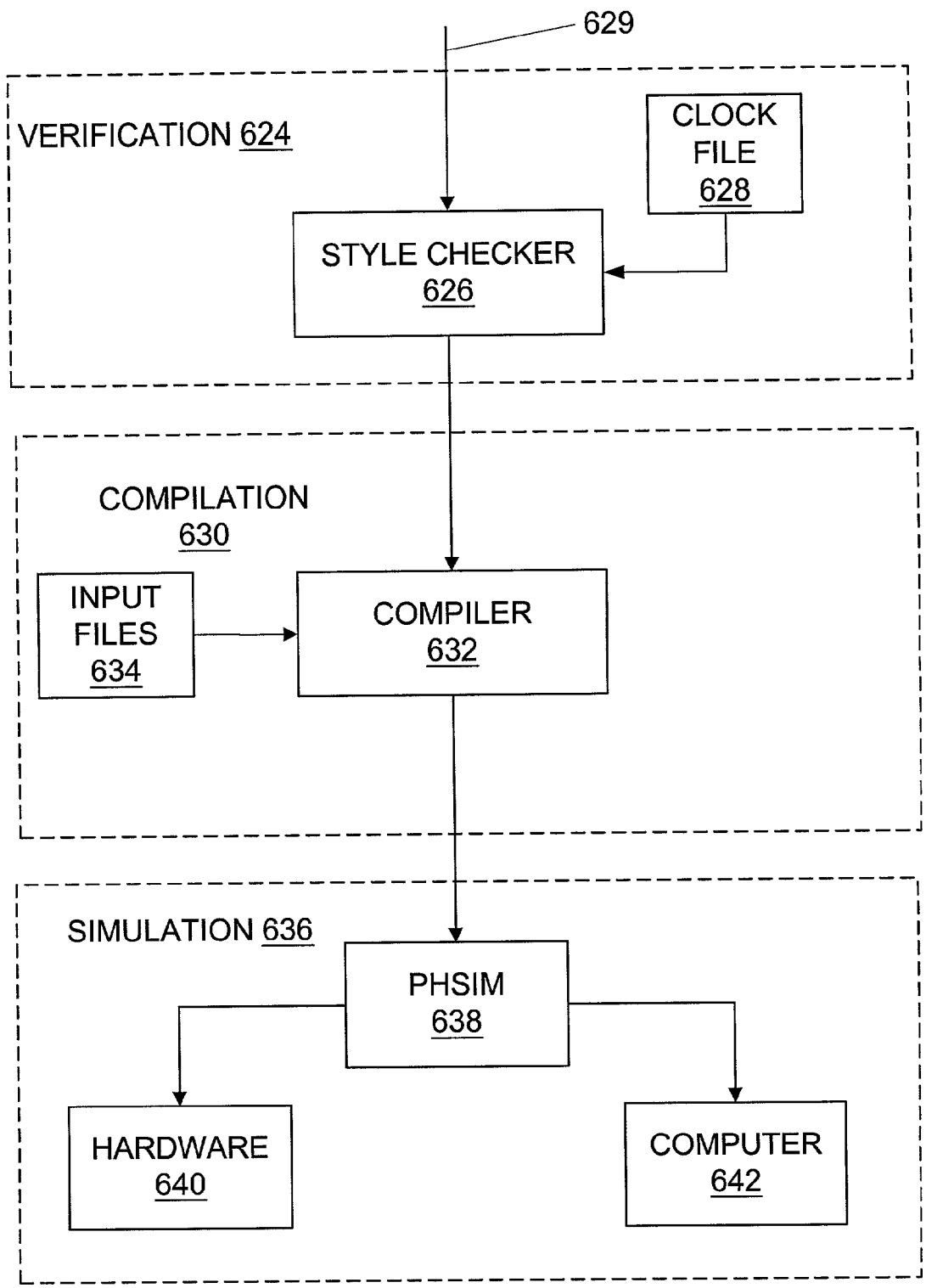
FIG. 6 shows an execution processor block diagram in accordance with an embodiment of the present invention.

In accordance with one or more embodiments of the present invention, FIG. 6 shows a process of preparing a simulation of a cycle-based logic design to run on a cycle-based system. The process includes three separate phases. The first phase is a verification phase (624). This phase includes a style checker (626), which parses and checks high level design code of a program (629) representing the cycle-based design. The program is checked for adherence to a cycle-based design standard, e.g., synchronous logic design, no combinatorial logic loops, etc. An error action during this phase results from nonconformance to the defined cycle-based design standards. A clock file input (628) defines clocks cycles for the simulation. The output of the verification phase (624) produces a verified cycle-based design.

The second phase is a compilation phase (630), which receives the verified cycle-based design as input from the verification phase (624). The compilation phase (630) uses a translation component, such as a compiler (632), to compile the verified cycle-based design of the verification phase (624). The compiler (632) decomposes the verified cycle-based design into execution processor code that may be executed in parallel on a processor array of the cycle-based system by one or more execution processors. The compiler also produces routing tables and other information, such as routing processor code, control code and an annotation symbol table. Routing tables enable static routing of messages sent during run mode segment. An annotation symbol table involves recording physical locations where the values of nets and registers have been stored, so that user interface and Programming Language Interface (PLI) routines may access values of nets and registers during runtime. Input files (634), e.g., PLI and TVI files, etc., provide functionality for items such as system task calls and trace vectors. A user system task call enables a host computer to execute an appropriate portion of a simulation. A trace vector typically contains test input data and expected outputs for testing. Errors in cycle-based designs input into the compiler (632) causes an error action. The compiler and code generation includes a scheme for routing of messages and placement of compiled execution processor code so that there is some optimization in the choice of which of the parallel execution processors of the simulation hardware to use for certain tasks. This is because the time required for delivery of a message from one processor to another depends upon the data connection component between those execution processors, (i.e., the number of hops the message takes in traversing the data connection component from source processor to destination processor). One skilled in the art can appreciate that compilation of a program may be targeted to a specific execution environment and/or platform, e.g., Phaser system hardware or an appropriate computer, such as a SPARC™ workstation produced by Sun Microsystems, Inc.

The third phase is the simulation phase (636), which receives input in the form of execution processor code from the compilation phase (630). A PHaser SIMulator (638) (PHSIM) typically runs on a host computer and controls and monitors execution of simulations executing on the cycle-based system. The host computer includes such hardware and software mechanisms as are needed to manage simulation, e.g., loading execution processor code onto a processor array. PHSIM (638) enables user interaction with a simulation using a graphical user interface (GUI) or with a command line interface, interactive modification of simulation state, breakpointing, test vector use, system task functionality, signal tracing, single-stepping on clock cycles, and other functionalities. A simulation cycle begins with one or more simultaneous clock edges and completes when every dependent events has completed evaluation. The simulation phase (636) may run on system hardware (640), which is designed for cycle-based computation, or on an appropriate computer, such as a SPARC™ workstation (642) produced by Sun Microsystems, Inc.

A data connection component includes a hierarchy of levels. Routing processors handle message sending at each level. In accordance with one or more embodiments of the present invention, there exist four levels of the data connection component: a scalable mesh of system boards connecting to a chassis backplane, a mesh of ASICs on a system board connecting via I/O buffers, a main cluster crossbar connecting functional units on an ASIC, and a sub-cluster crossbar connecting execution processors.

Statically routed messages are passed over the data connection component. In run mode segment, the destination of a message is determined by instructions in execution processors of the processor array and the routing processors. Timing and routing information for messages sent over the data connection during run mode segment is statically determined by a translation component during compilation.

The computer systems described above are for purposes of example only. An embodiment of the invention may be implemented in any type of computer system or programming or processing environment.

Figure 7:
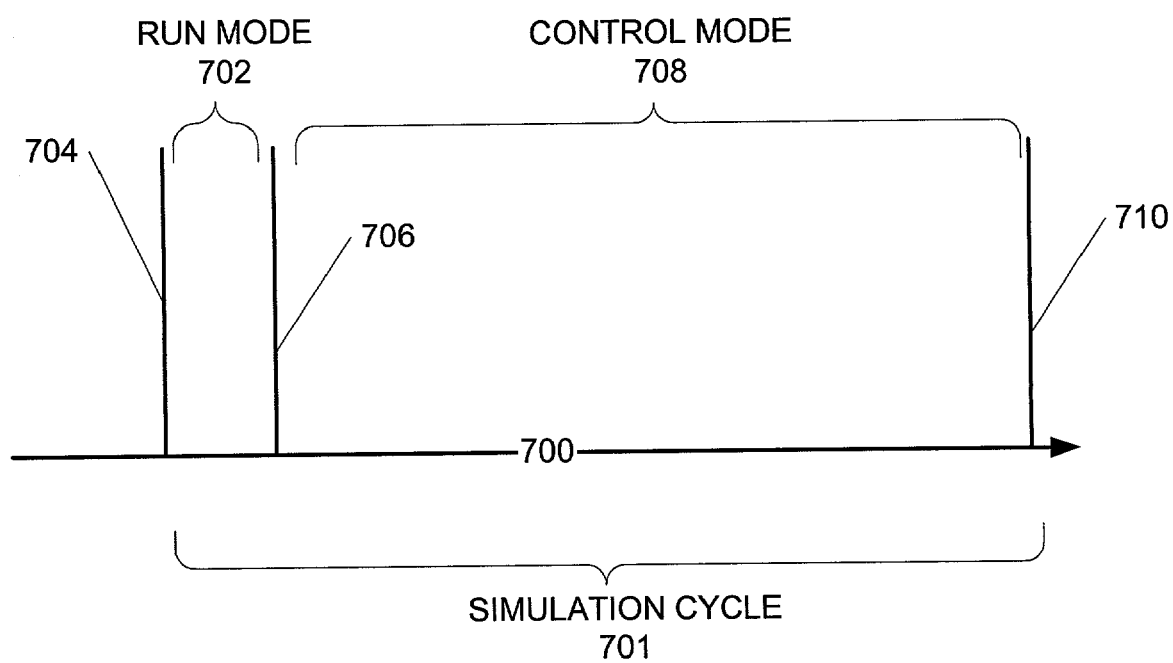
FIG. 7 shows, in accordance with one or more embodiments of the present invention, a timeline and a simulation cycle with a system call.
Figure 8:
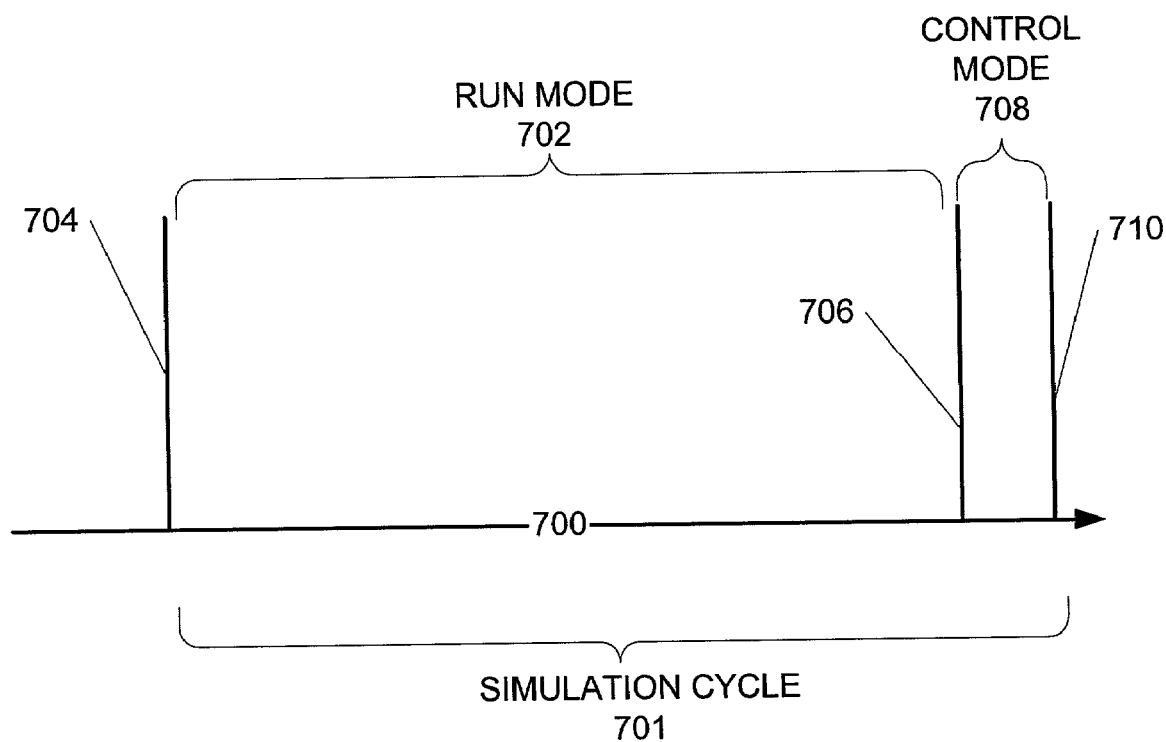
FIG. 8 shows, in accordance with one or more embodiments of the present invention, a timeline and a simulation cycle during normal execution.

A simulation cycle includes a run mode segment, used to perform simulation of a logic design, and a control mode segment, used to observe and control simulation, e.g., configuration and initialization, processing user and system task calls, checkpointing, single-stepping, diagnostics, etc. FIG. 7 shows a timeline (700), and a simulation cycle (701) with a run mode segment (702) that begins with a first signal to enter run mode segment (704). The signal to enter run mode segment (704) is sent to a processor array. Certain conditions initiate the generation of a signal to enter control mode segment (706). A second signal to enter run mode segment (710) sent to the processor array causes the processor array to begin execution of execution processor code. The particular simulation cycle example shown in FIG. 7 shows that the control mode segment takes longer than the run mode segment, which may be the case if there are system calls to service. However, during normal execution, a control mode segment will take less time than a run mode segment. FIG. 8 shows an example of a simulation cycle (701) during normal execution, where a run mode segment (702) is longer than a control mode segment (708).

Figure 9:
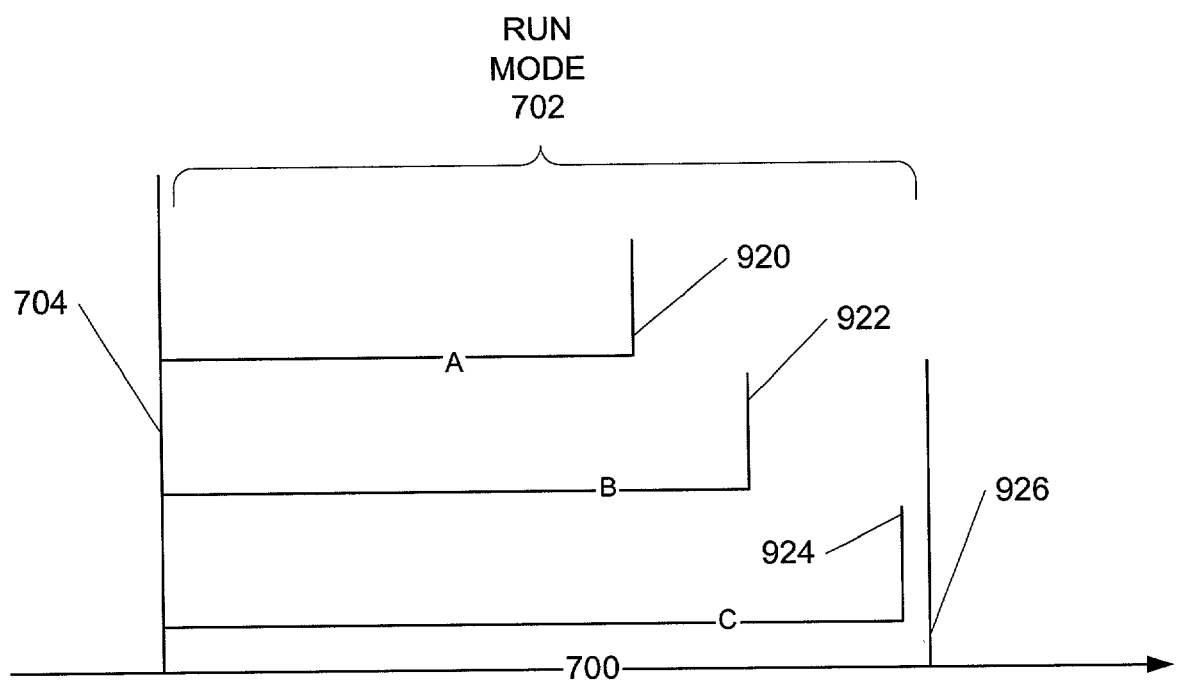
FIG. 9 shows, in accordance with one or more embodiments of the present invention, an example of a run mode segment of a simulation cycle.

FIG. 9 shows an example of the run mode segment (702). During run mode segment (702), multiple execution processors of the processor array execute execution processor code. Different execution processors of the processor array may finish execution of the execution processor code at different times. For example, a time interval for execution of execution processor code for execution processor A (920), a time interval for execution of execution processor code for execution processor B (922), and a time interval for execution of execution processor code for execution processor C (924) are shown. When every execution processor executing execution processor code for a particular simulation finishes execution, the simulation may be placed in control mode segment, if necessary. Certain signals sent from an execution processor may necessitate that a simulation be placed in control mode segment before every execution processor involved in the simulation is completed with execution of execution processor code. For example, an execution processor may generate a host service request, e.g., requesting that a host computer perform part of a simulation. Otherwise, if control mode segment is not needed, then run mode segment resumes after a signal to resume run mode segment (926) is sent to the processor array.

Figure 10:
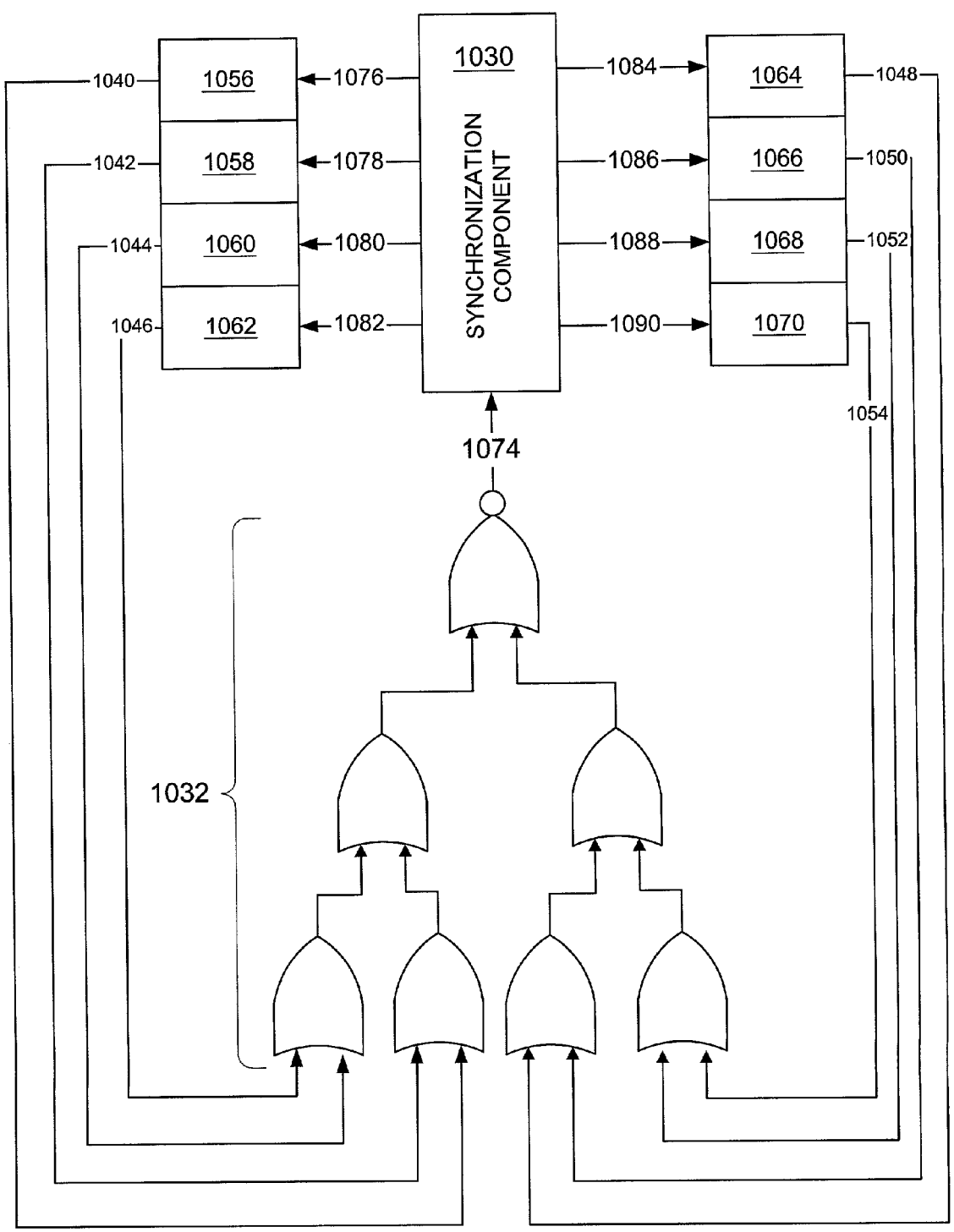
FIG. 10 shows, in accordance with one or more embodiments of the present invention, an example of global synchronization accomplished via a synchronization component.

Execution of execution processor code by execution processors is synchronized globally across the processor array. While an execution processor is executing execution processor code, the value of a run bit is set to "1." When the execution processor is finished executing execution processor code, the value of a run bit is set to "0," which sends a signal to an FPGA, e.g., an FPGA associated with a host bridge, to indicate that the execution processor has finished executing execution processor code. When every execution processor executing execution processor code for a particular simulation is finished, and no execution processor has made a host service request, a global synchronization signal is sent from the FPGA to the execution processors, and the execution processors resume execution substantially simultaneously. FIG. 10 shows global synchronization accomplished using a synchronization component (1030), a status tree (1032), and run bits (1040–1054) associated with execution processors executing execution processor code for a particular simulation. Execution processors (1056–1070) represent execution processors of a processor array executing execution processor code for a particular simulation. Halt bits (1040–1054) represent a status of the execution processors (1056–1070), where an execution processor is either running (executing execution processor code), or halted. The run bits (1040–1054) of the execution processors (1056–1070) are OR'ed together in the status tree (1032) and negated to produce a Processor Array Execution Status signal (1074). When every run bit (1040–1054) has a value of "0," that means every execution processor (1056–1070) is finished executing execution processor code. The Processor Array Execution Status signal (1074) is sent back to the execution processors (1056–1070) via feedback loops (1076–1090) as a mode change synchronization signal, which arrives at the execution processors (1056–1070) at substantially the same time, causing the execution processors (1056–1070) to begin executing execution processor code, thereby producing global synchronization. The same global synchronization system as detailed in this paragraph is used to synchronize routing processors as well.

A cycle-based system includes a host service request component, which includes a control tree and an attention tree. The control tree and the attention tree are an out-of-band system that uses circuitry other than a data connection component to communicate with entities of a processor array. The control tree and the attention tree are the principal mechanism for maintaining synchronization of a simulation. The control tree and the attention tree are constant-depth binary trees extending into individual elements of ASICs.

Figure 11:
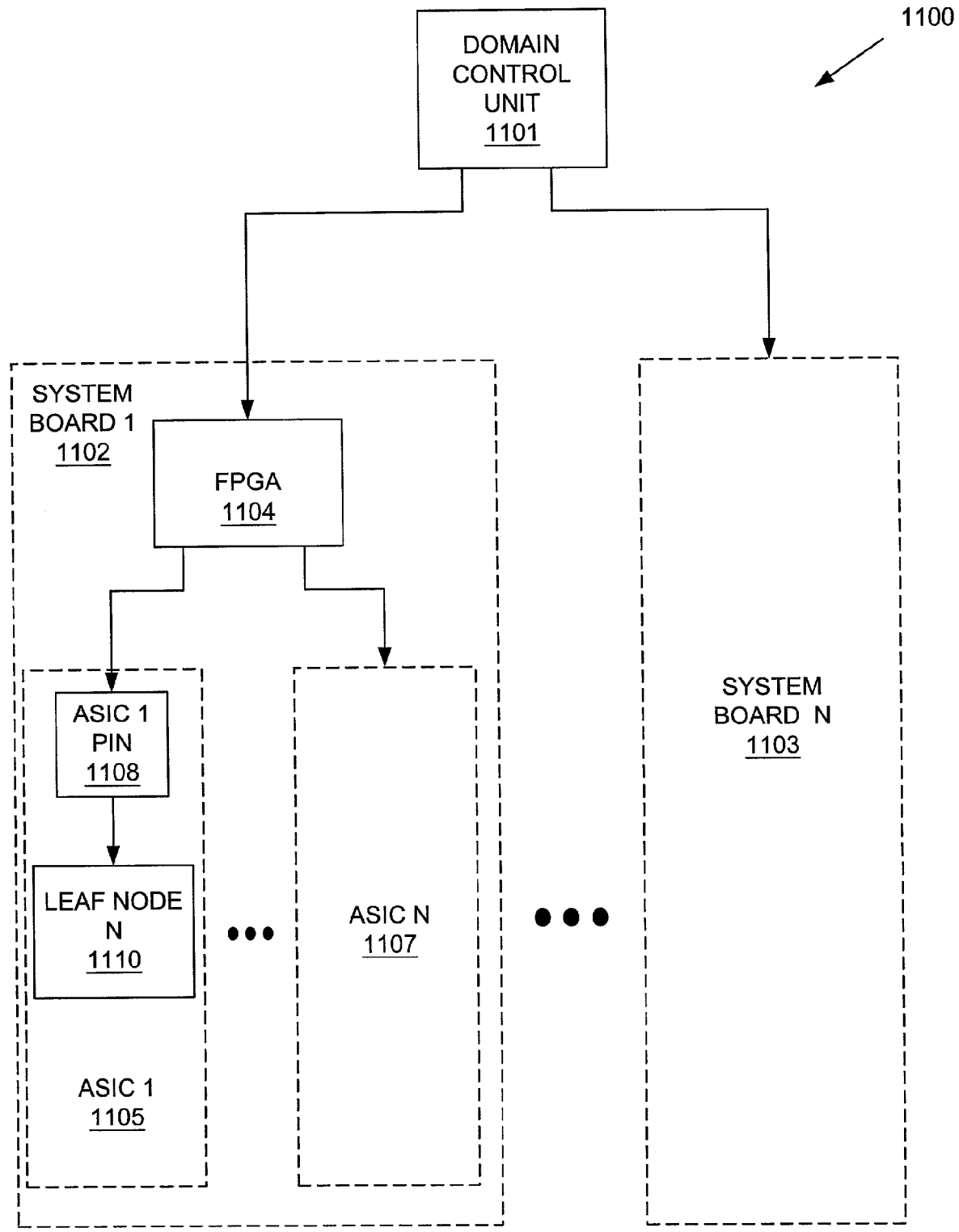
FIG. 11 shows, in accordance with one or more embodiments of the present invention, an example of a control tree.

A control tree is used primarily for stopping and starting simulation execution of a simulation. The control tree is used to switch a simulation from run mode segment to control mode segment, and from control mode segment to run mode segment. The control tree also causes execution processors to resume execution of a simulation after every execution processor executing execution processor code for a particular simulation has completed executing execution processor code. FIG. 11 shows a portion of a control tree (1100), controlled by a domain control unit (1101). The control tree (1100) may include system board 1 (1102) through system board N (1103). System board 1 (1102) includes FPGA (1104) and ASIC 1 (1105) though ASIC N (1107). ASIC 1 (1105) includes ASIC 1 pin (1108) and N leaf nodes, of which only leaf node N (1110) is shown. A control tree signal is propagated from the domain control unit (1101) to system boards and associated FPGAs, through ASIC pins, to leaf nodes. A leaf node associated with a control tree is a control line to a functional unit, such as an execution processor, or a signal from a functional unit. Examples of control tree signals are signals that switch a simulation from a run mode segment to a control mode segment, and a signal to cause a simulation to resume execution of execution processor code.

An attention tree is used to enable execution processors and other functional units of a processor array to report status information, such as run signals (to indicate whether an execution processor is executing execution processor code), execution errors or fault alerts, to an FPGA on a system board, e.g., a host bridge, embedded controller, etc. For example, a host service request may be sent from an execution processor in the form of a request for attention, such as an input/output transaction with a host computer, a request for an interrupt, or a system task call. A host service request may be handled by the host computer when every execution processor executing execution processor code for a particular simulation has completed execution of execution processor code, and subsequently, the control tree places a simulation in control mode segment. Alternatively, if the host service request is of an urgent nature, such as a fault alert, the control tree may place the simulation in control mode segment before every execution processor has completed execution of execution processor code.

Figure 12:
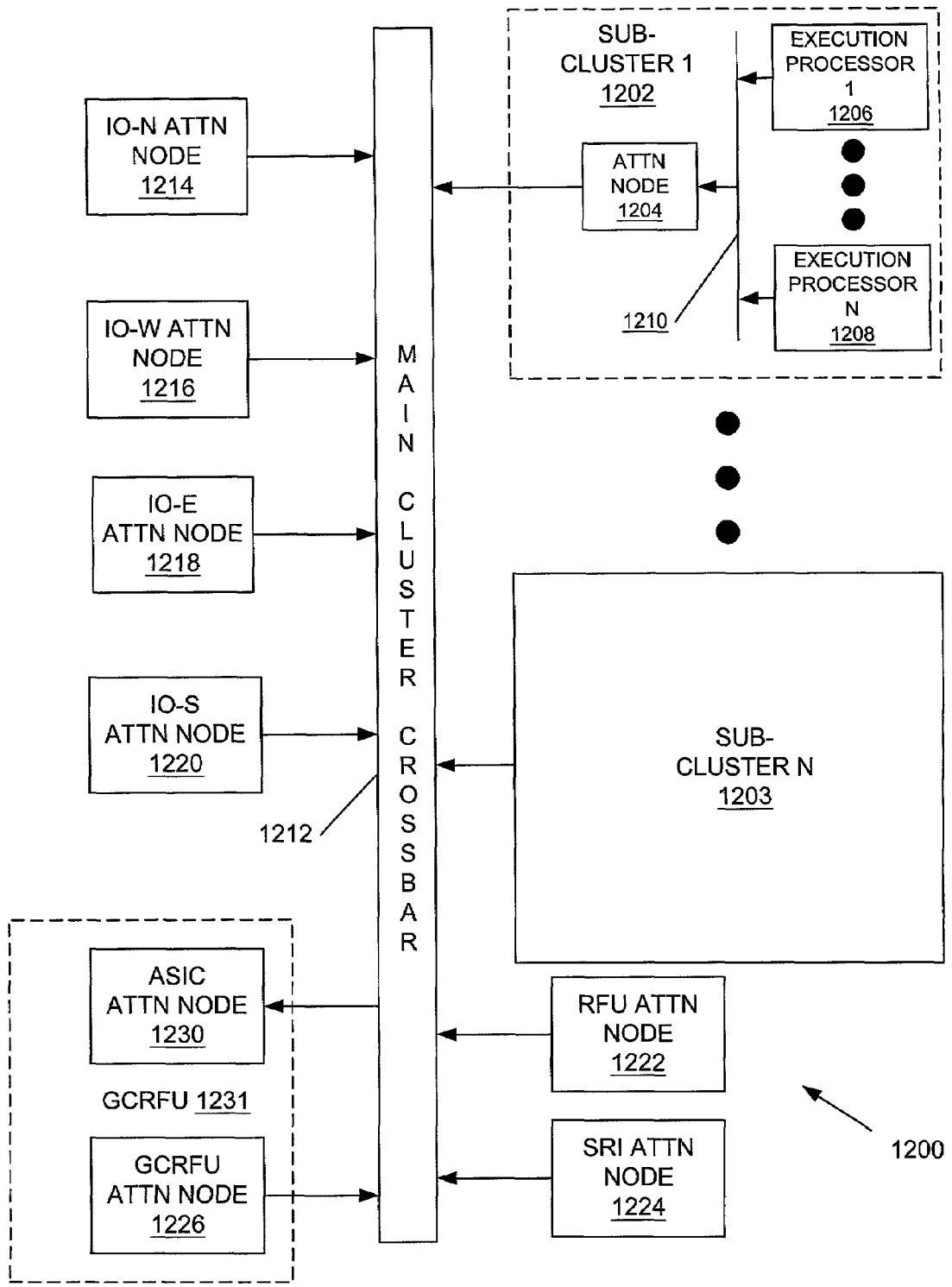
FIG. 12 shows, in accordance with one or more embodiments of the present invention, an example of a portion of an attention tree.

FIG. 12 shows a portion of an attention tree (1200). Sub-clusters 1 (1202) through sub-cluster N (1203) may include multiple attention nodes (1204–1205). Execution processor 1 (1206) through execution processor N (1208) of sub-cluster 1 (1202) send information through a sub-cluster crossbar (1210) into an associated attention node (1204). In addition to receiving information from attention nodes associated with sub-clusters 1 though N (1202–1203), a main cluster crossbar (1212) also receives information from an input/output buffer N attention node (1214), an input/output buffer W attention node (1216), an input/output buffer E attention node (1218), an input/output buffer S attention node (1220), an RFU attention node (1222), an SRI attention node (1224), and a GCRFU attention node (1226). Information from each attention node is sent to an ASIC attention node (1230) associated with a GCRFU (1231), and is forwarded to an FPGA. Attention tree information originating from execution processors at lower levels of a control tree, is OR'ed at higher levels of the attention tree and passed on to a host computer.

In control mode segment, a host computer communicates with execution processors and other functional units associated with a simulation using an access component, which includes a broadcast tree and a reply tree. Broadcast tree messages are sent from the host computer to functional units on ASICs using the broadcast tree, and reply tree messages are sent to the host computer from functional units on ASICs using the reply tree. ASICs are nodes of the broadcast tree and the reply tree. ASICs are linked together as nodes in the broadcast tree and the reply tree using the data connection component. Specifically, ASICs are linked as nodes using input/output buffers. Parent and child relationships among nodes in the broadcast tree and the reply tree are determined at the start of a simulation. A message traveling over the broadcast tree or the reply tree is propagated to or from functional units on the ASIC using a data connection component. Use of the access component does not require the execution of execution processor code and routing processor code by execution processors and routing processors. The access component thus enables a host computer to read and write data and instructions to and from system memory and registers using the data connection component.

A broadcast tree message, such as a read command from a host computer to an execution processor, is propagated from a root of a broadcast tree until the broadcast tree message reaches the execution processor. When an execution processor sends a reply tree message over a reply tree to a host computer, e.g., responding to a poll issued by the host computer, the reply tree message travels to successive parent nodes until the reply tree message reaches the host computer. In control mode segment, a host computer polls execution processors in the processor array, responding to reply tree messages from execution processors and polling execution processors until no further reply tree messages from execution processors are detected, and control mode segment is then exited and run mode segment begins.

Figure 13:
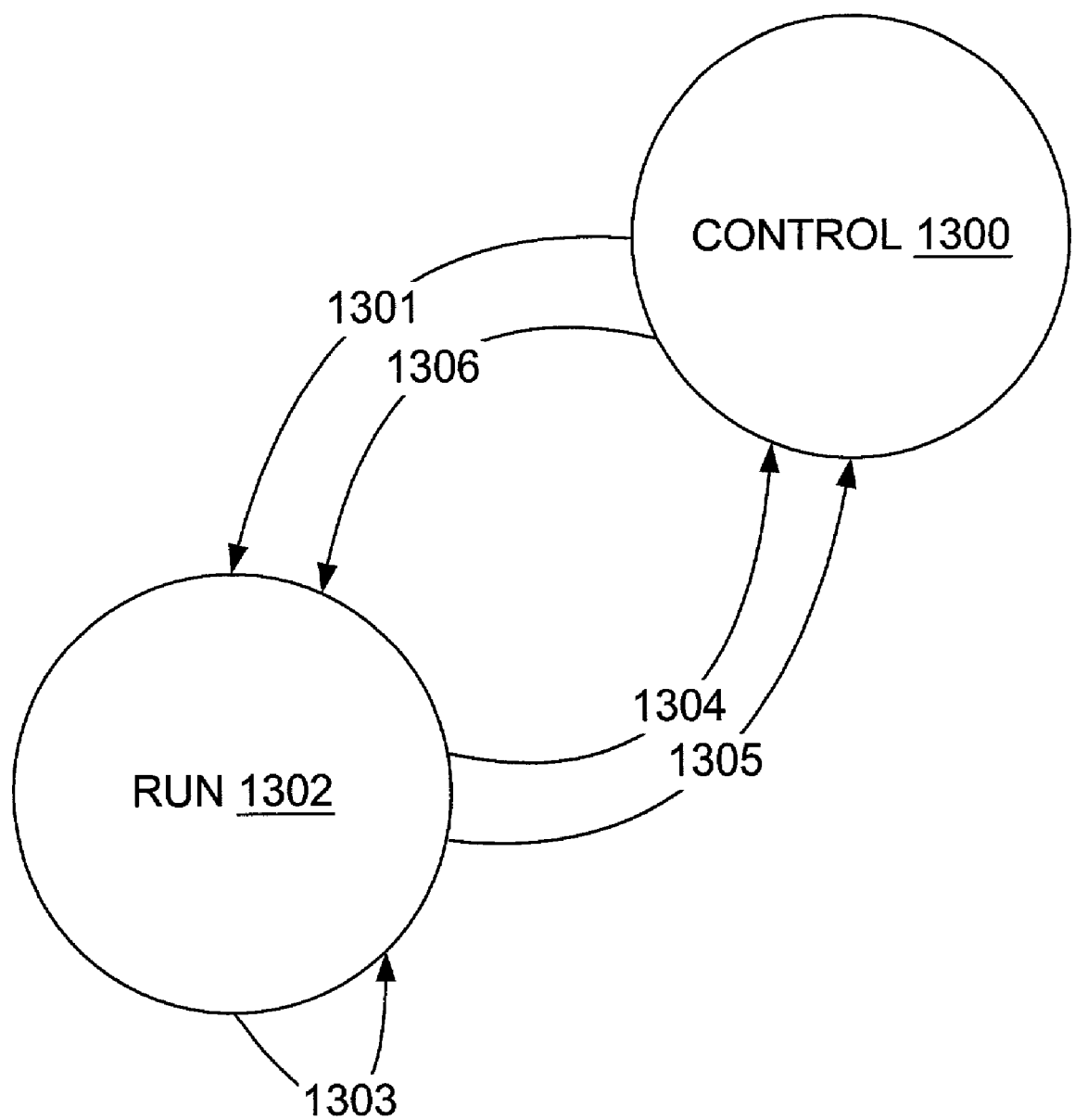
FIG. 13 shows, in accordance with one or more embodiments of the present invention, an example of a simulation using a partial state diagram.

In accordance with one or more embodiments of the present invention, FIG. 13 shows a partial state diagram for a simulation on a cycle-based system. After initialization and configuration, which includes loading execution processor code onto a processor array, the simulation is placed in control mode segment (1300) and awaits commands from a host computer.

When the host computer generates a Begin Run Mode Segment Transition (1301), the simulation enters run mode segment (1302) and execution processors execute execution processor code, and routing processors execute routing processor code. When every execution processor associated with the simulation has completed execution of execution processor code, and no outstanding host service requests exist, a Remain in Run Mode Segment Transition (1303) is generated, the simulation remains in run mode segment (1302) and every execution processors associated with the simulation begins execution of execution processor code substantially simultaneously.

If, however, an outstanding host service request exists when every execution processor associated with the simulation has completed execution of execution processor code, a Go To Control Mode Segment Transition (1304) is generated, and the simulation enters control mode segment (1300). Certain types of host service requests of an urgent nature can cause the generation of a Immediate Go To Control Mode Segment Transition (1305) before every execution processors associated with the simulation has completed execution of execution processor code. In control mode segment (1300), host service requests and/or reply tree messages are handled. Then, when no outstanding host service requests or reply tree messages are detected, a Resume Run Mode Segment Transition (1306) is generated.

Figure 14:
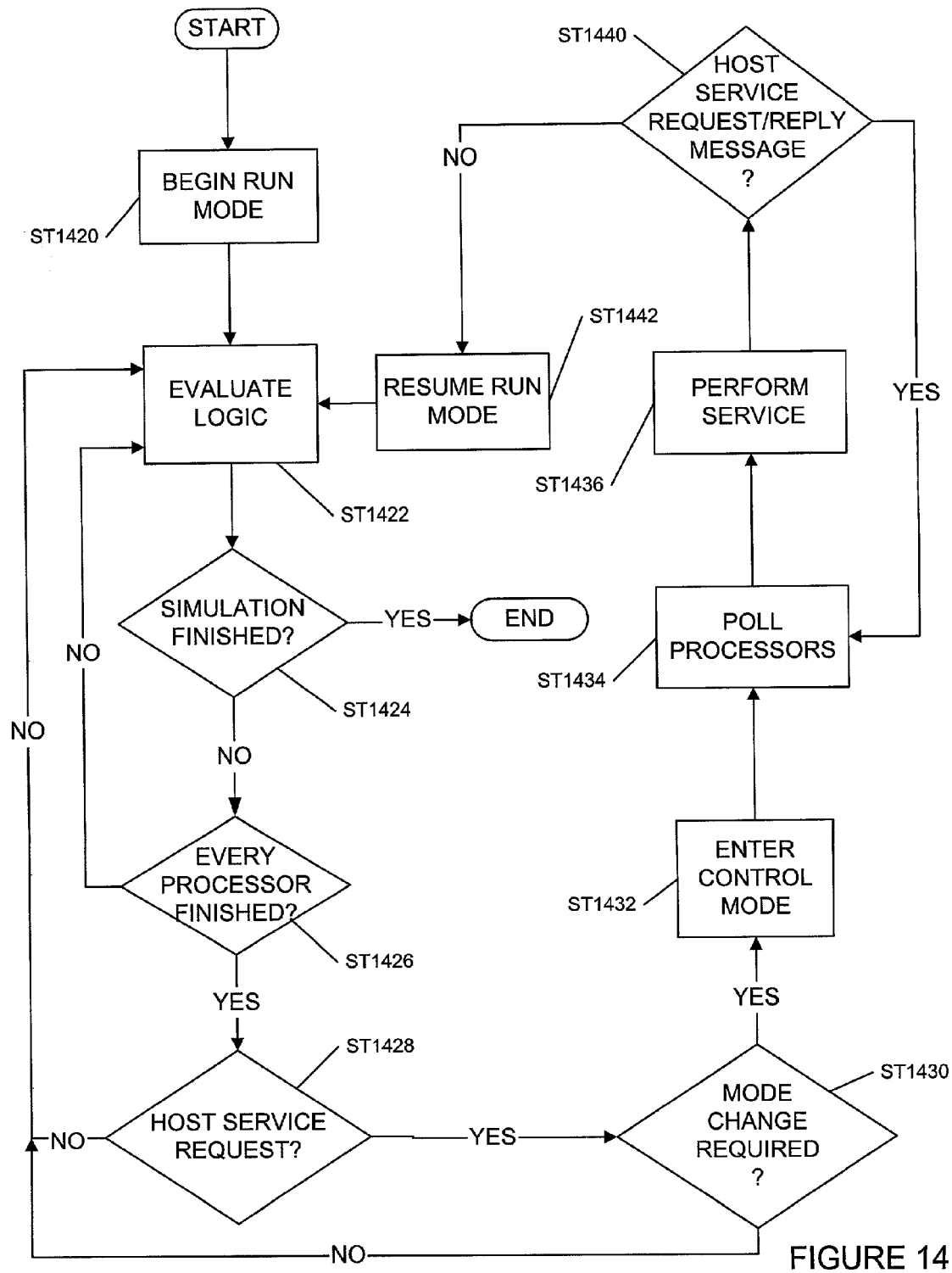
FIG. 14 shows, in accordance with one or more embodiments of the present invention, an example of cycle-based computation where a logic design is simulated.

FIG. 14 shows a sequence of cycle-based computation where a logic design is simulated, in accordance with one or more embodiments of the present invention. A simulation begins in run mode segment (Step 1420). The logic circuitry of the logic design is evaluated by execution processors in a processor array by executing execution processor code (Step 1422). A determination is made as to whether the simulation is finished (Step 1424). If the simulation is not finished, a determination is made as to whether every execution processors has finished executing execution processor code (Step 1426). If not every execution processor has finished executing execution processor code, logic evaluation continues (Step 1422). If every execution processors has finished executing execution processor code, a determination is made as to whether a host service request has been made (Step 1428). If no host service request has been made, logic evaluation continues (Step 1422). If a host service request has been made, a determination is made as to whether an immediate mode change (to control mode segment) is required, depending on the type of host service request (Step 1430). If an immediate mode change is not required, the sequence proceeds to Step 1422. Otherwise, an immediate mode change is required, and, control mode segment begins (Step 1432). The execution processors are polled to determine which execution processors require service (Step 1434). A service is performed for the execution processor requiring service (Step 1436). Then a determination is made as to whether another host service has been requested, or if a reply tree message requires answering (Step 1440). If a host service has been requested, or a reply tree message requires answering, the execution processors are polled to determine which execution processors require service (Step 1434). Else, if a service has not been requested, run mode segment resumes (Step 1442).

Advantages of the present invention include one or more of the following. The invention provides the advantages of having a large capacity for software simulation, the ability to easily modify a logic design, and flexibility while maintaining acceptable operation speeds. The access component of the present invention affords low latency access (low number of bus cycles) to the processor array state. The present invention provides the fast simulation times of hardware simulation while maintaining a large capacity and relatively simple reprogramming. The result is a simulation system that provides high-speed simulation, permitting an adequate number of testing cycles, provides large capacity so that entire designs and systems can be tested, and provides fast reconfiguration. The present invention is scalable, thereby enhancing ability to keep pace with emerging complex and high device count logic designs. The present invention, with large amounts of memory distributed across the system architecture, avoids memory-access latencies introduced when attempting to execute large logic designs. The present invention affords a relatively lower cost than other hardware-assisted simulations. Those skilled in the art will appreciate that the present invention may include other advantages and features.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer system for cycle-based computation, comprising:
   a processor array;
   a translation component adapted to translate a cycle-based design;
   a host computer operatively connected to the processor array and to the translation component;
   a data connection component interconnecting a plurality of members of the processor array using static routing, wherein the data connection component comprises a plurality of levels, wherein each member of the plurality of levels contains a routing processor to perform static routing;
   a synchronization component enabling known timing relationships among the plurality of members of the processor array;
   a host service request component adapted to send a host service request from a member of the processor array to the host computer; and
   an access component adapted to access a portion of a state of the processor array and a portion of a state of the data connection.

2. The computer system of claim 1, wherein the cycle-based design is translated into execution processor code, routing processor code, and control code.

3. The computer system of claim 1, wherein the cycle-based design comprises a plurality of simulation instructions written in a computer readable language.

4. The computer system of claim 3, wherein the plurality of simulation instructions comprises a design logic instruction translated from hardware description language source code.

5. The computer system of claim 3, wherein the plurality of simulation instructions comprises a design logic instruction translated from Verilog source code.

6. The computer system of claim 3, wherein the plurality of simulation instructions comprises a design logic instruction translated from register transfer level source code.

7. The computer system of claim 3, wherein the computer readable language is a hardware description language.

8. The computer system of claim 3, wherein the computer readable language is a high level computer programming language.

9. The computer system of claim 1, wherein the access component comprises a computer network operatively connected to the host computer and to the data connection component.

10. The computer system of claim 1, wherein the access component comprises a broadcast tree and a reply tree.

11. The computer system of claim 1, wherein the host service request component comprises a control tree and an attention tree.

12. The computer system of claim 1, wherein the member of the processor array is capable of multiple-bit calculations.

13. The computer system of claim 1, wherein the member of the processor array has memory resources.

14. The computer system of claim 1, wherein the member of the processor array is capable of executing custom instructions.

15. The computer system of claim 1, wherein static routing is scheduled prior to execution of cycle-based computation.

16. The computer system of claim 1, wherein the data connection component comprises a plurality of levels, wherein each member of the plurality of levels contains a crossbar switch.

17. The computer system of claim 1, wherein the data connection component enables expansion of the processor array.

18. The computer system of claim 1, wherein the data connection component comprises a register file unit storage memory.

19. The computer system of claim 1, wherein the data connection component comprises a global control register file unit storage memory.

20. The computer system of claim 1, wherein the data connection component comprises an input output buffer.

21. The computer system of claim 1, wherein the data connection component comprises a backplane connecting a plurality of system boards.

22. The computer system of claim 1, wherein a message is routed to the member of the processor array using the data connection component.

23. The computer system of claim 22, wherein the message comprises a tag identifier for identifying the message to the member of the processor array.

24. The computer system of claim 23, wherein the tag identifier is statically assigned.

25. The computer system of claim 23, wherein the tag identifier is checked by the data connection component to ensure timing correctness of message delivery.

26. The computer system of claim 23, wherein the tag identifier is checked by the data connection component to determine a correct routing of the message.

27. The computer system of claim 1, wherein the access component does not require execution of execution processor code by the member of the processor array.

28. The computer system of claim 1, wherein the access component does not require execution of routing processor code by a routing processor.

29. The computer system of claim 1, wherein the access component supports reading from and writing to the state of the processor array by the host computer.

30. The computer system of claim 1, wherein the host service request comprises a request for a cycle-based designing language interface call.

31. The computer system of claim 1, wherein the host service request comprises a request for an input/output call.

32. The computer system of claim 1, wherein the host service request comprises a request for an interrupt.

33. The computer system of claim 1, wherein the routing processor specifies message routing connections.

34. The computer system of claim 1, further comprising:
a loading mechanism to load the execution processor code onto the processor array from the host computer.

35. The computer system of claim 1, further comprising:
a callback mechanism enabling a portion of the cycle-based computation to be performed on the host computer.

36. The computer system of claim 1, further comprising:
a plurality of simulation domains.

37. The computer system of claim 36, wherein the plurality of simulation domains are divided by a simulation domain boundary.

38. A computer system for cycle-based computation, comprising:
a processor array;
a translation component adapted to translate a cycle-based design;
a host computer operatively connected to the processor array and to the translation component;
a data connection component interconnecting a plurality of members of the processor array using static routing, wherein the data connection component comprises a plurality of levels, wherein each member of the plurality of levels contains a routing processor to perform static routing;
a synchronization component enabling known timing relationships among the plurality of members of the processor array;
a host service request component adapted to send a host service request from a member of the processor array to the host computer;
an access component adapted to access a portion of a state of the processor array and a portion of a state of the data connection;
a loading mechanism to load the execution processor code onto the processor array from the host computer;
a callback mechanism enabling a portion of the cycle-based computation to be performed on the host computer; and
a plurality of simulation domains.

39. A method for performing computation on a cycle-based computing environment, comprising:
translating a cycle-based design into cycle-based computation code;
executing the cycle-based computation code on a member of a processor array to generate a message;
statically routing the message along a data connection component, wherein the data connection component comprises a plurality of levels, wherein each member of the plurality of levels contains a routing processor to perform static routing;
synchronizing execution of the cycle-based computation code;
sending a host service request from the member of the processor array to a host computer; and
accessing a portion of a state of the processor array and a portion of a state of a data connection component.

40. The method of claim 39, wherein the cycle-based computation code comprises:
an execution processor code; a static routing code; and a control code.

41. The method of claim 40, further comprising:
executing the control code on a host interface to interface the host computer with the processor array.

42. The method of claim 40, further comprising:
loading the execution processor code and the static routing code onto the processor array.

43. The method of claim 39, wherein executing the cycle-based computation code is performed on a plurality of simulation domains.

44. The method of claim 39, wherein the cycle-based design comprises a plurality of simulation instructions written in a computer readable language.

45. The method of claim 39, further comprising:
executing a portion of the cycle-based design on the host computer.

46. The method of claim 39, further comprising:
responding to the host service request.

47. A method for performing computation on a cycle-based computing environment, comprising:
translating a cycle-based design into cycle-based computation code;
executing the cycle-based computation code on a member of a processor array to generate a message;
statically routing the message along a data connection component, wherein the data connection component comprises a plurality of levels, wherein each member of the plurality of levels contains a routing processor to perform static routing;
synchronizing execution of the cycle-based computation code;
sending a host service request from the member of the processor array to a host computer;
accessing a portion of a state of the processor array and a portion of a state of a data connection component;
executing a portion of the cycle-based design on the host computer;
responding to the host service request.

48. A method of preparing a cycle-based design for simulation, comprising:
verifying a design standard of the cycle-based design using a style checker to generate a verified cycle-based design;
compiling the verified cycle-based design to produce execution processor code and a routing table; and
producing a simulation by executing the execution processor code on a member of a processor array;
wherein the simulation uses the routing table to statically route a message to the member of the processor array along a data connection component, wherein the data connection component comprises a plurality of levels, wherein each member of the plurality of levels contains a routing processor to perform static routing.

49. The method of claim 48, wherein the step of compiling the verified cycle-based design comprises producing an annotated symbol table.

50. The method of claim 48, wherein the step of compiling the verified cycle-based design comprises producing control code.

51. The method of claim 48, wherein the step of compiling the verified cycle-based design comprises producing execution processor code targeted to a specific environment.

52. A method of synchronizing cycle-based computation on a processor array, comprising:
executing execution processor code on the processor array;
detecting a value of a run bit associated with a member of the processor array;
halting execution of execution processor code on the processor array if a host service request from the member of the processor array is detected; and
resuming execution of execution processor code on the processor array if the value of the run bit has a predetermined value, and the host service request from the member of the processor array is not detected;

wherein execution of execution processor code uses a statically routed message to the member of the processor array along a data connection component, wherein the data connection component comprises a plurality of levels, wherein each member of the plurality of levels contains a routing processor to perform static routing.

53. The method of claim 52, further comprising:
polling the member of the processor array to detect the host service request from the member of the processor array.

54. The method of claim 52, further comprising:
polling the member of the processor array to detect a reply tree message from the member of the processor array.

55. The method of claim 52, further comprising:
resuming execution of execution processor code on the processor array if the value of the run bit has a predetermined value, and a reply tree message from the member of the processor array is not detected.

56. A method of synchronizing cycle-based computation on a processor array, comprising:
executing execution processor code on the processor array;
detecting a value of a run bit associated with a member of the processor array;
halting execution of execution processor code on the processor array if a host service request from the member of the processor array is detected;
resuming execution of execution processor code on the processor array if the value of the run bit has a predetermined value, and the host service request from the member of the processor array is not detected;
polling the member of the processor array to detect the host service request from the member of the processor array;
polling the member of the processor array to detect a reply tree message from the member of the processor array; and
resuming execution of execution processor code on the processor array if the value of the run bit has a predetermined value, and a reply tree message from the member of the processor array is not detected,
wherein execution of execution processor code uses a statically routed message to the member of the processor array along a data connection component, wherein the data connection component comprises a plurality of levels, wherein each member of the plurality of levels contains a routing processor to perform static routing.

57. An apparatus for performing computation on a cycle-based computing environment, comprising:
means for translating a cycle-based design into cycle-based computation code;
means for executing the cycle-based computation code on a member of a processor array to generate a message;
means for statically routing the message along a data connection component;
means for synchronizing execution of the cycle-based computation code;
means for sending a host service request from the member of the processor array to a host computer; and
means for accessing a portion of a state of the processor array and a portion of a state of a data connection component,
wherein the data connection component comprises a plurality of levels, wherein each member of the plurality of levels contains a routing processor to perform static routing.

58. An apparatus for preparing a cycle-based design for simulation, comprising:
means for verifying a design standard of the cycle-based design using a style checker to generate a verified cycle-based design;
means for compiling the verified cycle-based design to produce execution processor code and a routing table; and
means for producing a simulation by executing the execution processor code on a member of a processor array;
wherein the simulation uses the routing table to statically route a message to the member of the processor array along a data connection component, wherein the data connection component comprises a plurality of levels, wherein each member of the plurality of levels contains a routing processor to perform static routing.

59. An apparatus for synchronizing cycle-based computation on a processor array, comprising:
means for executing execution processor code on the processor array;
means for detecting a value of a run bit associated with a member of the processor array;
means for halting execution of execution processor code on the processor array if a host service request from the member of the processor array is detected; and
means for resuming execution of execution processor code on the processor array if the value of the run bit has a predetermined value, and the host service request from the member of the processor array is not detected,
wherein execution of execution processor code uses a statically routed message to the member of the processor array along a data connection component, wherein the data connection component comprises a plurality of levels, wherein each member of the plurality of levels contains a routine processor to perform static routing.

* * * * *